United States Patent [19]

Youngblood

[11] Patent Number: 4,472,777
[45] Date of Patent: Sep. 18, 1984

[54] ENGINE CONTROL APPARATUS FOR VEHICLE SPEED

[75] Inventor: Ralph A. Youngblood, Livonia, Mich.

[73] Assignee: Ford Motor Company, Dearborn, Mich.

[21] Appl. No.: 333,961

[22] Filed: Dec. 23, 1981

[51] Int. Cl.³ .................. B60Q 5/00; B60K 31/00
[52] U.S. Cl. .................. 364/426; 340/52 F; 123/351
[58] Field of Search ...... 364/426, 565, 431.05–431.09, 364/424; 123/552, 568, 351, 352; 180/179, 170; 340/52 F

[56] References Cited

U.S. PATENT DOCUMENTS

| | | | |
|---|---|---|---|
| 3,068,849 | 12/1962 | Thorner | 123/389 |
| 3,348,625 | 10/1967 | Thorner | 180/178 |
| 3,348,626 | 10/1967 | Thorner | 180/178 |
| 4,034,335 | 7/1977 | Harazoe et al. | 340/52 F |
| 4,244,023 | 1/1981 | Johnson | 364/431.07 |
| 4,337,839 | 7/1982 | Taplin | 180/179 |
| 4,347,570 | 8/1982 | Akiyama et al. | 364/431.04 |
| 4,348,726 | 9/1982 | Igarashi et al. | 364/424 |

*Primary Examiner*—Felix D. Gruber
*Assistant Examiner*—Thomas G. Black
*Attorney, Agent, or Firm*—Peter Abolins; Robert D. Sanborn

[57] ABSTRACT

This specification discloses an engine control apparatus to limit engine speed. Various sensors can be used to generate electrical signals which are processed by logic means to generate a signal to limit engine speed. There is thus provided an additional safeguard against uncontrolled vehicle acceleration. Typical sensed operating conditions used to determine the need for an output limiting engine speed include engine speed, vehicle speed, throttle angle position, engine load and a brake sensor.

5 Claims, 7 Drawing Figures

SD-SENSING AND DETECTING MEANS
S-SENSING MEANS

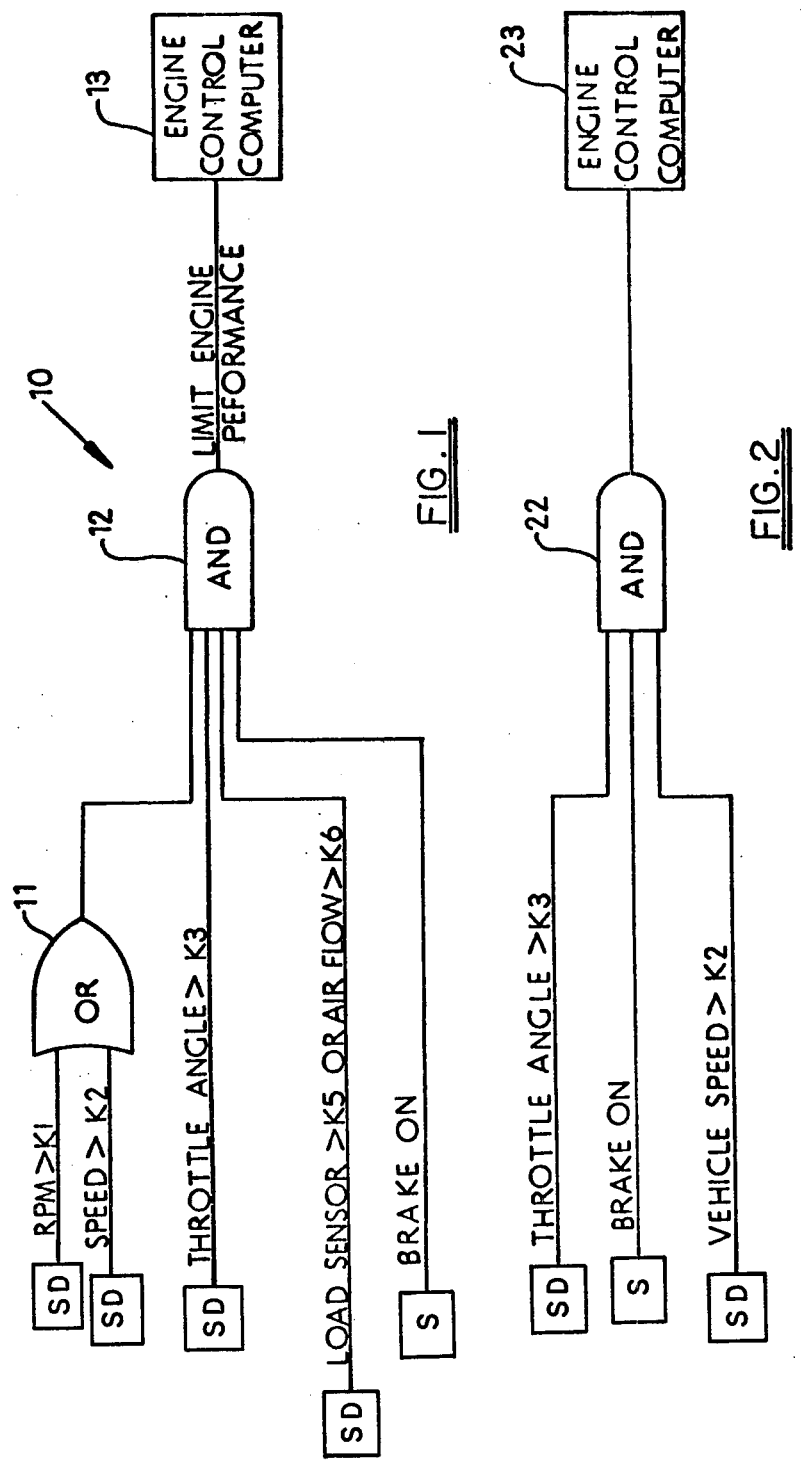

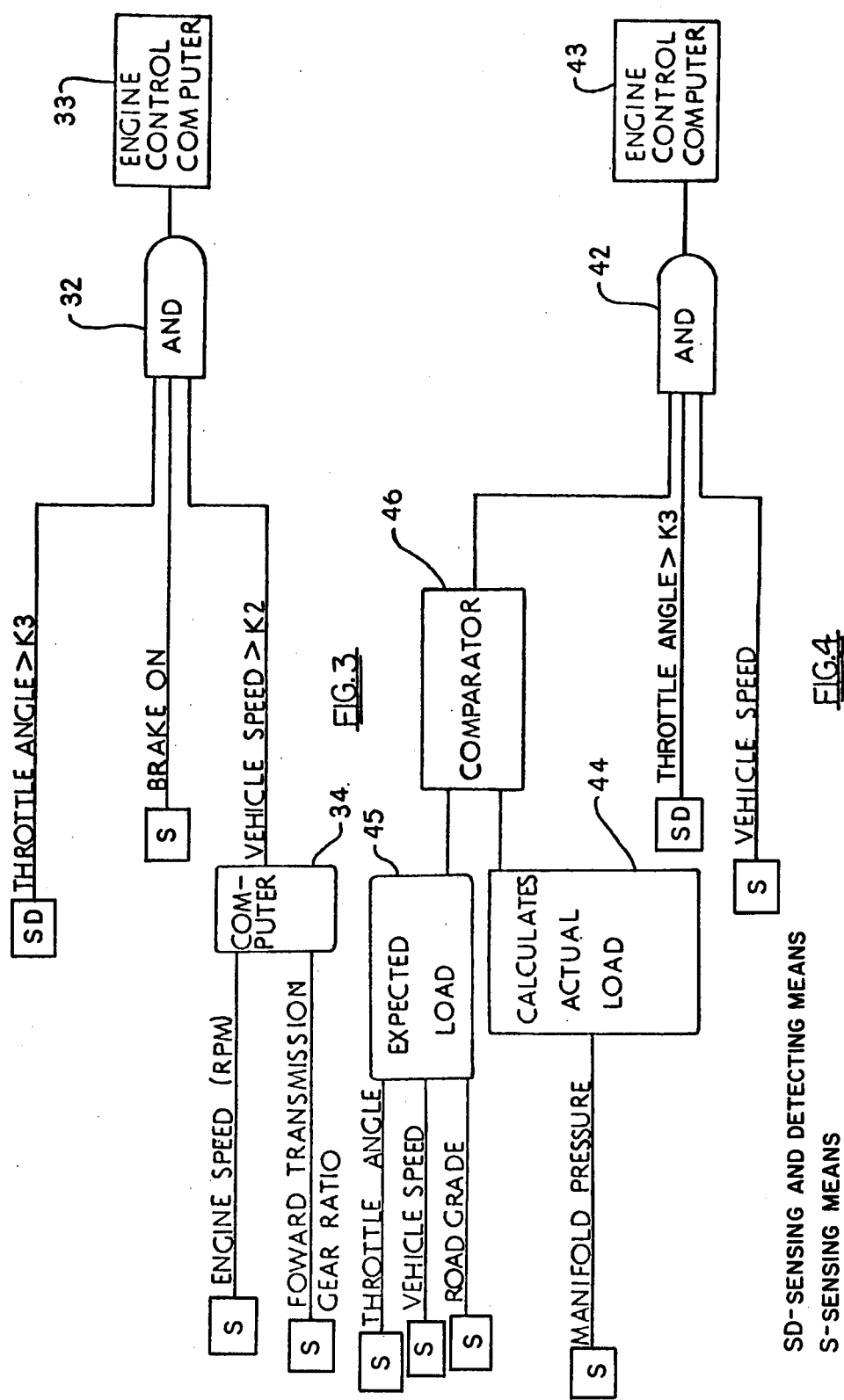

SD - SENSING AND DETECTING MEANS
S - SENSING MEANS

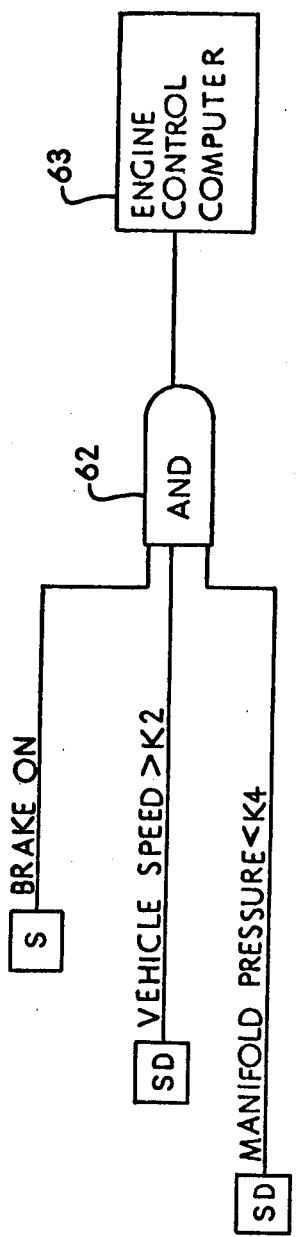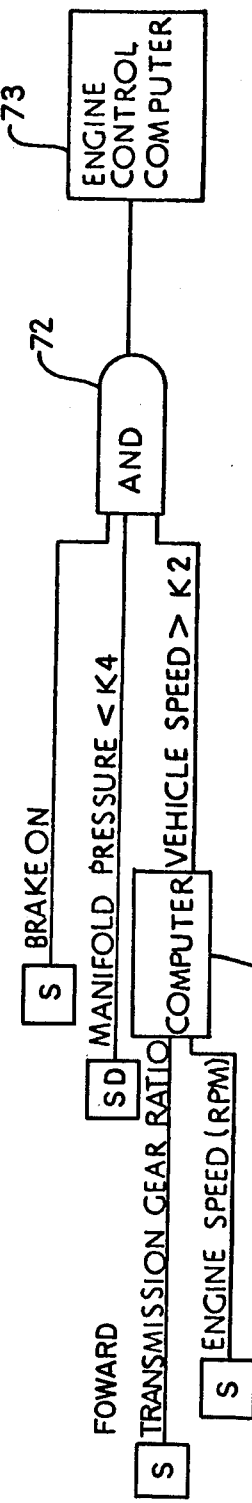
FIG.6
FIG.7
SD-SENSING AND DETECTING MEANS
S-SENSING MEANS

ENGINE CONTROL APPARATUS FOR VEHICLE SPEED

BACKGROUND OF THE INVENTION

1. Field of the Invention

This invention relates to the control of a vehicle mounted engine.

2. Prior Art

The prior art teaches various electronic controls for controlling spark applied to the engine and fuel applied to the engine. Further, also known are electronic controls for governing the speed of a vehicle without the necessity for the driver to keep his foot on the accelerator pedal.

With such automated vehicle operation, there is a possibility of malfunction. It is particularly desirable to avoid unexpected or undesired vehicle accelerations. These are some of the problems this invention overcomes.

SUMMARY OF THE INVENTION

In accordance with an embodiment of this invention, an engine control apparatus limits engine speed and includes sensors generating electrical signals which are processed by logic means to finally generate a signal to limit engine speed.

For example, the engine control apparatus can include an engine speed sensing means for detecting engine speed greater than a predetermined amount K1, a vehicle speed sensing means for detecting a vehicle speed greater than a predetermined amount K2, a throttle angle position sensor for detecting vehicle throttle angle position greater than a predetermined amount K3, a manifold pressure sensor for detecting pressure less than predetermined amount K4 and a brake sensor for detecting brake on.

A first logic means can have inputs coupled to the engine speed sensing means and the vehicle speed sensing means for providing an output when either input is present. A second logic means can be coupled to the output of the first logic means, the throttle angle position sensor, the manifold pressure sensor and the brake sensor for providing an engine limiting output when all inputs have an applied signal to provide a safeguard against uncontrolled vehicle acceleration.

DESCRIPTION OF THE DRAWING

FIG. 1 is a schematic drawing of inputs and logic means used to provide an output signal for limiting engine speed, including redundant inputs, in accordance with an embodiment of this invention;

FIGS. 2 through 7 are schematic drawings of alternative minimum inputs and logic means used to provide an output signal for limiting engine speed, FIG. 2 including the inputs of throttle position, brake on and vehicle speed, FIG. 3 including inputs of throttle position, brake on, engine speed and forward transmission gear ratio, FIG. 4 including the inputs of throttle position, vehicle speed, manifold pressure, and road grade, FIG. 5 including the inputs of throttle position, engine speed, manifold pressure, road grade and forward transmission gear ratio, FIG. 6 including the inputs of brake on, vehicle speed and manifold pressure, and FIG. 7 including inputs of brake on, engine speed, manifold pressure, forward transmission gear ratio in accordance with an embodiment of this invention.

DETAILED DESCRIPTION OF THE INVENTION

Figure 5:
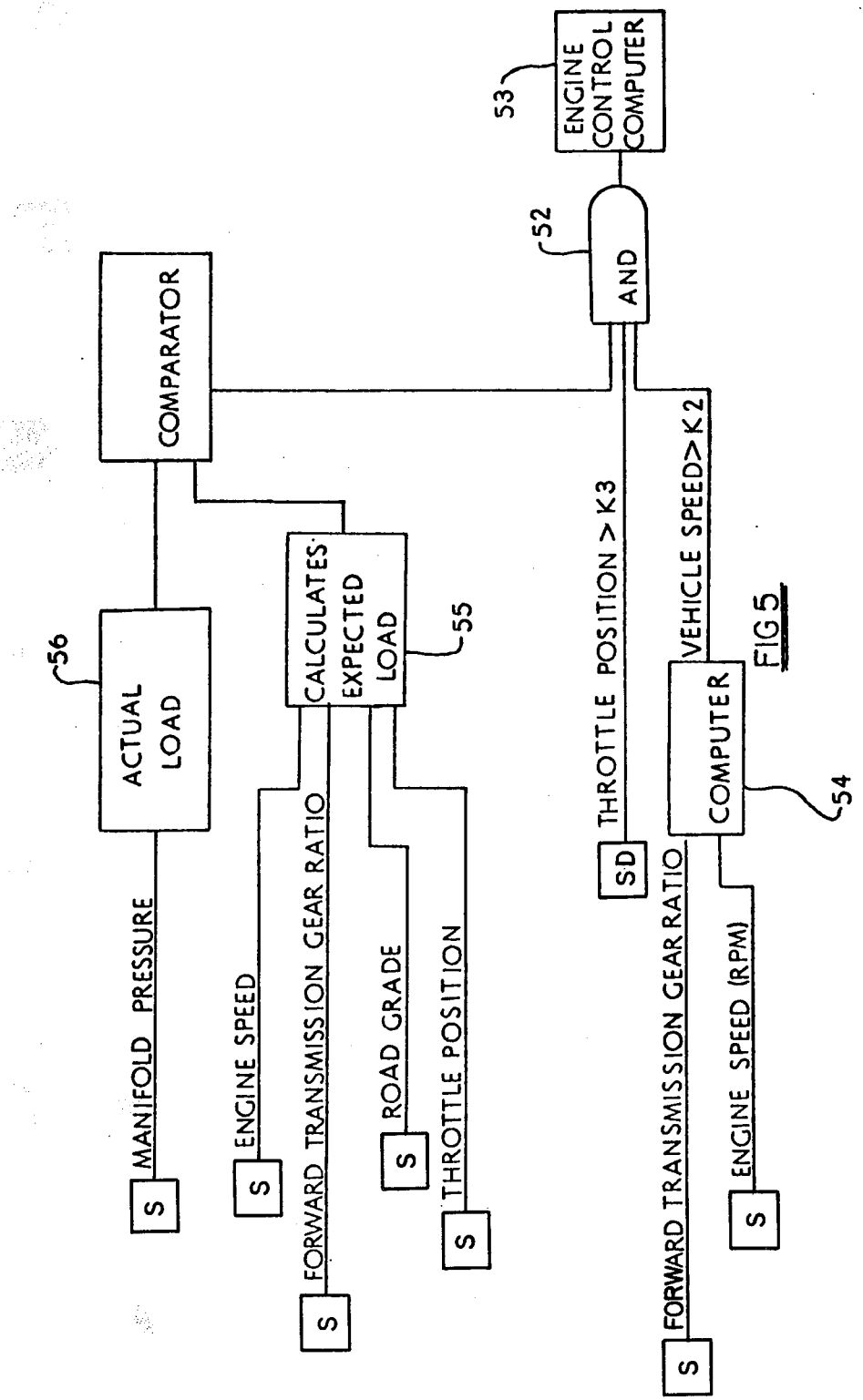

Referring to FIG. 1, an engine control apparatus 10 includes a logic OR gate 11 having an input indicating that engine revolutions per minute have exceeded a predetermined value K1 and an input indicating that vehicle speed has exceeded a predetermined value K2. Logic gate 11 is an OR gate so that when either input is present an output is present.

The output of logic gate 11 is applied to and logic AND gate 12. Logic gate 12 also has an input if the throttle position angle is greater than a predetermined constant K3, the manifold pressure is less than a predetermined constant K4 and there is indication that the brakes are being applied. In accordance with the known operation of an AND gate, logic gate 12 produces an output when inputs are present on all four of the gate inputs. Upon the occurrence of input signals to all of the inputs of AND gate 12, an output is produced from gate 12 which is used to limit engine speed.

As indicated in FIG. 1, a signal indicative of manifold pressure being less than a predetermined constant, K4 can be replaced by other signals. In general, a signal is desired which indicates that the engine load is above a predetermined constant K5. In addition to manifold pressure, a signal indicating air flow in excess of a predetermined constant K6 can be used.

There are additional combinations of sensor outputs which enable one to detect a stuck throttle condition. For example, below is a listing of six system configurations with various sensor sets which could be used to detect a stuck throttle condition. These systems are considered to be "minimum sensor sets" in that an output from each of the sensors must be received in order to be sure that a stuck throttle condition exists.

Nevertheless, sensors in addition to the "minimum" set could be used to provide a safety margin through redundancy. That is, redundancy would be desirable in case of failure in one of the sensors or to help avoid false triggering of the system. When a false trigger occurs, the engine performance is limited even though there is no stuck throttle and no need to limit engine performance.

| Sensor | System Configuration | | | | | |
|---|---|---|---|---|---|---|
| | (FIG. 2) A | (FIG. 3) B | (FIG. 4) C | (FIG. 5) D | (FIG. 6) E | (FIG. 7) F |
| Throttle Position (>K3) | x | x | x | x | | |
| Brake On | x | x | | | x | x |
| Vehicle Speed (>K2) | x | | x | | x | |
| Engine Speed (>K1) | | x | | x | | x |
| *Manifold Pressure (<K4) | | | x | x | x | x |
| Road Grade | | | x | x | | |

-continued

| | System Configuration | | | | | |
|---|---|---|---|---|---|---|
| Sensor | (FIG. 2) A | (FIG. 3) B | (FIG. 4) C | (FIG. 5) D | (FIG. 6) E | (FIG. 7) F |
| Forward Transmission Gear Ratio | | x | | x | | x |

*or any other indication of engine load

Vehicle speed may of course be determined from a sensor of actual vehicle speed. However, additionally, sensors for engine speed and transmission gear can be used in conjunction with knowledge of axle ratios to compute vehicle speed. Similarly, it is possible to replace a sensor detecting brake actuation. That is, sensors can be used to detect road grade, i.e., the inclination of travel and used in conjunction with a reasonable expectation of expected load at a given speed. This "reasonable expected load" can be compared to the actual load to determine if the driver has his foot on the brake.

In operation, this engine control apparatus can provide a safeguard against uncontrolled vehicle acceleration due to a faulty speed control system, sticky throttle linkage or other related failures. Using input signals available in automobiles having electronic engine controls or automatic speed controls, the values of the input signals are continuously cross correlated to determine whether the system is operating properly. In the event a fault is discovered which is causing the throttle to remain open, the engine control computer can be desiged to take corrective action. For example, referring to FIG. 1, an engine control computer 13 can receive the output of logic gate 12 and produce appropriate engine control signals. Examples of appropriate engine control action include initiating full or partial shut off of spark or fuel. Fuel shutoff is advantageous because unburned fuel is not sent through the engine to cause possible damage to the catalytic converter of the emission control system.

Referring to FIG. 2, system A has three inputs to an AND gate 22 which then puts out a signal to limit engine performance implemented by an engine control computer 23. The three inputs to AND gate 22 are a signal indicating throttle position is greater than a predetermined constant K3, a signal indicating that the brake is being applied and a signal indicating that vehicle speed is greater than a predetermined constant K2.

Referring to FIG. 3, an AND gate 32 has three inputs which, when present, cause AND gate 30 to produce an output to cause an engine control computer 33 to limit engine performance. The system of FIG. 3 is similar to that of FIG. 2 with the exception that vehicle speed is calculated by a logic computer 34 from engine speed (RPM) and the forward transmission gear ratio. That is, if engine speed is known and the powertrain gear ratio coupling the engine to the road is known, the vehicle speed can be computed. As before, the three inputs to AND gate 32 are a throttle position greater than a predetermined constant K3, an indication of brake being applied, and a vehicle speed greater than a predetermined constant K2.

Referring to FIG. 4, an AND gate 42 has three inputs which when all present cause the production of an output signal to an engine control computer 43 to limit engine performance. The system of FIG. 4 is similar to that of FIG. 2 in that AND gate 42 has an input indicating a throttle position greater than a predetermined constant K3 and vehicle speed greater than a predetermined constant K2. However, replacing a signal indicating the brakes being applied, is an indication that the actual load is greater than the predicted or expected load. The calculated actual load is done by a computer 44 having an input of manifold pressure. The calculation of expected load is done by a computer 45 having inputs of throttle position, vehicle speed and road grade. The outputs of computer 44 and 45 are applied to a comparator 46 which produces an output when the actual load exceeds the expected load and applies that output to an input of AND gate 42. Alternatively, if desired, computer 44 can be eliminated and computer 45 can generate a signal which can be compared to the signal representing manifold pressure in comparator 46.

Referring to FIG. 5, an AND gate 52 is similar to that of AND gate 42 of FIG. 4 in that there are three inputs representative of vehicle speed being greater than a predetermined constant K2, a throttle position being greater than a predetermined constant K3 and an indication of actual load exceeding expected load. When these three inputs are present at AND gate 52, an output is applied to an engine control computer 53 to limit engine performance. However, in contrast to FIG. 4, vehicle speed is computed by a computer 54 having inputs of the forward transmission gear ratio and engine speed in RPM's. Also, in contrast to FIG. 4, a computer 55 calculates expected load using inputs of engine speed, forward transmission gear ratio, road grade and throttle position. A computer 56 calculates actual vehicle load and has an input of manifold pressure. The outputs of computers 55 and 56 are applied to a comparator 57 which produces an output when the actual load exceeds the expected load. In such an event, an input signal is applied to AND gate 52.

Referring to FIG. 6, an AND gate 62 has three inputs indicating a brake applied, a vehicle speed greater than predetermined constant K2 and a manifold pressure less than a predetermined constant K4. If all these inputs are present, an output is applied to an engine control computer 63 to limit engine performance.

Referring to FIG. 7, an AND gate 72 has inputs of brakes being applied, a manifold pressure less than a predetermined constant K4 and a vehicle speed greater than a predetermined constant K2. An output from AND gate 72 is applied to an engine control computer 73 to produce an engine limiting output. However, in contrast to FIG. 6, vehicle speed is calculated by a computer 74 which has inputs of the forward transmission gear ratio and the engine speed in RPM's.

This invention provides an additional safeguard against uncontrolled vehicle acceleration. The invention only comes into operation when there is abnormal vehicle operation. That is, there is an additional evaluation of sensor readings to control shut off or partial shut off or engine operation.

Various modifications and variations will no doubt occur to those skilled in the various arts to which this invention pertains. For example, the particular values of the predetermined constants may be varied. These and all other variations which basically rely on the teachings through which this disclosure has advanced the art are properly considered within the scope of this invention as defined by the appended claims.

I claim:

1. An engine control apparatus for a vehicle engine for limiting engine speed comprising:
   a throttle angle position sensing and detecting means for detecting a throttle angle position greater than a predetermined amount K3;
   a brake sensor for detecting the application of brakes;
   an engine speed sensing means for detecting an engine speed;
   a forward transmission gear ratio sensor for indicating the engagement of each forward transmission gear;
   a computation means having inputs coupled to said engine speed sensing means and said forward transmission gear ratio sensor and having stored information describing vehicle drive ratios coupled to the engine for providing an output indicating a vehicle speed greater than a predetermined amount K2; and
   a logic gate means coupled to said computation means said throttle angle position sensing and detecting means, and said brake sensor for providing an engine limiting output to limit engine speed when all inputs have an applied signal.

2. An engine control apparatus for a vehicle engine for limiting engine speed comprising:
   a throttle angle position sensing and detecting means for detecting a throttle angle position and a throttle angle position greater than a predetermined constant K3;
   a vehicle speed sensing and detecting means for detecting vehicle speed and vehicle speed greater than a predetermined constant K2;
   a road grade sensor for detecting the grade of the surface on which the vehicle engine is traveling;
   a first computation means having stored information characterizing the operation of the vehicle engine and having inputs coupled to said throttle angle position sensing and detecting means, said vehicle speed sensing and detecting means, and said road grade sensor for computing an expected load applied to the vehicle engine;
   a manifold pressure sensor for sensing a vehicle manifold pressure thereby providing an indication of the actual vehicle load;
   a second computation means having an input coupled to said manifold pressure sensor and having a memory containing stored information characterizing the vehicle engine and having an output providing a signal indicating the actual load applied to the vehicle engine;
   a comparator means having a first input coupled to the output of said first computation means and a second input coupled to the output of said second computation means so that said comparator means provides an output when the actual load is greater than the expected load thus indicating the application of a braking force on the vehicle engine; and
   a logic AND gate having a first input coupled to the output of said comparator means for receiving an input when the actual load exceeds the expected load, a second input coupled to said throttle angle position sensing and detecting means for receiving a signal when the output of said throttle angle position sensing and detecting means exceeds a predetermined constant K3, and a third input coupled to said vehicle speed sensing and detecting means when said vehicle speed exceeds a predetermined constant K2, and having an output for providing an engine limiting output to limit engine speed when all of said three inputs to said logic AND gate have an applied signal.

3. An engine control apparatus for a vehicle engine for limiting engine speed comprising:
   an engine speed sensor for detecting the speed of the vehicle engine;
   a forward transmission gear ratio sensor for detecting the engagement of each of the forward transmission gears;
   a road grade sensor for detecting the grade of the surface upon which the vehicle engine is traveling;
   a throttle angle position sensing and detecting means for detecting a throttle angle position and a throttle angle position greater than a predetermined constant K3;
   a first computation means having inputs coupled to said engine speed sensor, said forward transmission gear ratio sensor, said road grade sensor, and said throttle angle position sensing and detecting means and having a memory with stored information characterizing vehicle operation so that expected vehicle engine load can be calculated, said first computation means having an output for providing a signal indicative of expected vehicle engine load;
   a manifold pressure sensor for providing an indication of the vehicle engine manifold pressure;
   a second computation means having an input coupled to said manifold pressure sensor and having memory with stored information indicative of vehicle engine operation so that the actual vehicle load can be computed and having an output carrying a signal indicative of the actual vehicle load;
   a comparator having a first input coupled to the output of said first computation means and a second input coupled to the output of said second computation means for producing an output signal when the actual vehicle engine load exceeds the expected vehicle load;
   a third computation means having an input coupled to said forward transmission gear ratio sensor and an input coupled to said engine speed sensor and having a memory including information characterizing the transmission ratios coupling the engine to the road surface and having an output for carrying a signal indicative of vehicle speed greater than a predetermined constant K2; and
   a logic gate having a first input coupled to the output of said comparator means, a second input coupled to said throttle angle position sensing and detecting means for receiving an input when the throttle angle position exceeds a predetermined constant K3, and a third input coupled to the output for providing an engine limiting output to limit engine speed when all the three inputs to the logic gate have an applied signal.

4. An engine control apparatus for a vehicle engine for limiting engine speed comprising:
   a brake sensor;
   a vehicle speed sensing and detecting means for detecting a vehicle speed greater than a predetermined amount K2;
   a manifold pressure sensing and detecting means for detecting a manifold pressure less than a predetermined amount K4; and a first logic means having inputs coupled to said manifold pressure sensing and detecting means, vehicle speed sensing and detecting means and brake sensor for providing an engine output limiting engine speed when all inputs have applied signals.

5. An engine control apparatus for a vehicle engine for limiting engine speed comprising:

a forward transmission gear ratio sensor for detecting the engagement of each forward gear;

an engine speed sensor for detecting engine speed;

a computation means having inputs coupled to said engine speed sensor and said forward transmission gear ratio sensor and having memory with stored information indicating the ratio of gear coupling between the vehicle engine and the road surface, and having an output with a signal indicating a vehicle speed greater than a predetermined constant K2;

a throttle angle position sensing and detecting means for detecting a throttle angle position greater than a predetermined amount K3;

a brake sensor for detecting the application of brakes; and a logic gate means having inputs coupled to said throttle angle position sensing and detecting means, said brake sensor, and said output of said computation means and having an output for providing an engine limiting signal output to limit engine speed when all of the inputs to said logic means have an applied signal.

* * * * *